United States Patent
Benco et al.

(10) Patent No.: US 8,010,119 B2
(45) Date of Patent: Aug. 30, 2011

(54) REAL-TIME TRANSMISSION OF A VIDEO BETWEEN MOBILE STATIONS

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 1680 days.

(21) Appl. No.: 10/835,676

(22) Filed: Apr. 30, 2004

(65) Prior Publication Data

US 2005/0246742 A1   Nov. 3, 2005

(51) Int. Cl.
*H04W 72/00* (2009.01)
(52) U.S. Cl. .......... 455/450; 455/416; 455/464
(58) Field of Classification Search .......... 455/414.1, 455/450, 414.14, 416, 417, 425, 41.2, 509, 455/550.1, 424, 41.1–41.3, 507, 513, 517, 455/115.1–115.3, 134, 135; 379/88.13; 725/62; 370/260–271
See application file for complete search history.

(56) References Cited

U.S. PATENT DOCUMENTS

| | | | |
|---|---|---|---|
| 7,245,933 B1 * | 7/2007 | Pan et al. | 455/519 |
| 7,486,649 B2 * | 2/2009 | Marsico et al. | 370/338 |
| 2004/0119814 A1 * | 6/2004 | Clisham et al. | 348/14.08 |
| 2005/0004968 A1 * | 1/2005 | Mononen et al. | 709/200 |
| 2007/0146475 A1 * | 6/2007 | Inoue | 348/14.01 |

OTHER PUBLICATIONS

Emblaze.com, "EMplayer," Apr. 6, 2004, 1 pg., www.emblaze.com/emblazesystems/main.asp?id=32, Emblaze Systems Ltd., Ra'anana, Israel.
Internetnews.com, "GEO, Samsung Unveil MPEG4 Video Cell Phone," Apr. 6, 2004, p. 1-2, www.internetnews.com/bus-news/print.php/513381, Jupitermedia Corp., Westport, CT, USA.
PC World.com, "Movies on Your Cell Phone," Apr. 6, 2004, p. 1-3, www.pcworld.com/news/article/0,aid,110043,00.asp, PC World Communications, San Francisco, CA, USA.
Calypso Wireless, "Calypso Phones," Apr. 6, 2004, 2 pgs., http://68.213.239.27/index.cfm, Miami Lakes, FL, USA.
Calypso Wireless, "Company History," Apr. 6, 2004, 1 pgs., http://68.213.239.27/index.cfm, Miami Lakes, FL, USA.
MOBILETECHNEWS.com, "Samsung's new SGH-Z105 Featuring Real-Time Video Telephony and Video Streaming," Apr. 6, 2004, 2 pgs., www.mobiletechnews.com/info/2004/03/20/153317.html.
WASHINGTONPOST.com, "Cell Phone Is Next Webcam Destination," Apr. 6, 2004, p. 1-3, www.washingtonpost.com/wp-dyn/articles/A46993-2004Apr3.html, The Washington Post Co., Arlington.
Earthcam Mobile, Apr. 6, 2004, 1 pg., http://mobile.earthcam.com/; Hackensack, NJ, USA.
Earthcam Mobile, "Quick Tour" 1 pg., http://mobile.earthcam.com/download.php; Hackensack, NJ, USA.

* cited by examiner

*Primary Examiner* — Lewis G. West
*Assistant Examiner* — Michael Nguyen
(74) *Attorney, Agent, or Firm* — Carmen Patti Law Group, LLC

(57) ABSTRACT

A real-time transmission of a video from a first mobile station to a second mobile station is performed through employment of a data path between the first mobile station and the second mobile station.

19 Claims, 2 Drawing Sheets

REAL-TIME TRANSMISSION OF A VIDEO BETWEEN MOBILE STATIONS

TECHNICAL FIELD

The invention relates generally to networks and more particularly to data transmission over networks.

BACKGROUND

A mobile phone equipped with a camera (i.e., a camera phone) takes and sends pictures to another mobile phone over a network. A user of the first camera phone takes a picture and stores the picture on the camera phone. The user of the first camera phone sends the picture to a second camera phone via an email message over the network. To relay pictures from an event that is occurring, the user of the first camera phone takes and sends multiple pictures to the second camera phone. As the picture travels from the first camera phone to the second camera phone via an email message, there is a time delay between the time the user of the first camera phone sends the picture to the time the second camera phone receives the picture.

Thus, a need exists for reducing a time delay to receive a picture sent from a first camera phone to a second camera phone.

SUMMARY

The invention in one implementation comprises a method. A real-time transmission of a video from a first mobile station to a second mobile station employs a data path between the first mobile station and the second mobile station.

Another implementation of the invention encompasses an apparatus. The apparatus comprises a mobile switch component that establishes a channel between a first mobile station on a cellular network and a second mobile station on the cellular network for a transmission of a video in real-time from the first mobile station to the second mobile station.

Yet another implementation of the invention encompasses an apparatus. The apparatus comprises a mobile switch component that determines an initiation of a transmission of a video from a first video-enabled mobile station to a second video-enabled mobile station. The first video-enabled mobile station and the second video-enabled mobile station communicate a voice call through employment of a fundamental channel between the first mobile station and the second mobile station. The mobile switch component establishes a supplemental channel between the first video-enabled mobile station and the second video-enabled mobile station based on the fundamental channel between the first video-enabled mobile station and the second video-enabled mobile station. The mobile switch component employs the supplemental channel to transmit the video in real-time from the first video-enabled mobile station to the second video-enabled mobile station.

DESCRIPTION OF THE DRAWINGS

Features of exemplary implementations of the invention will become apparent from the description, the claims, and the accompanying drawings in which:

DETAILED DESCRIPTION

Figure 1:
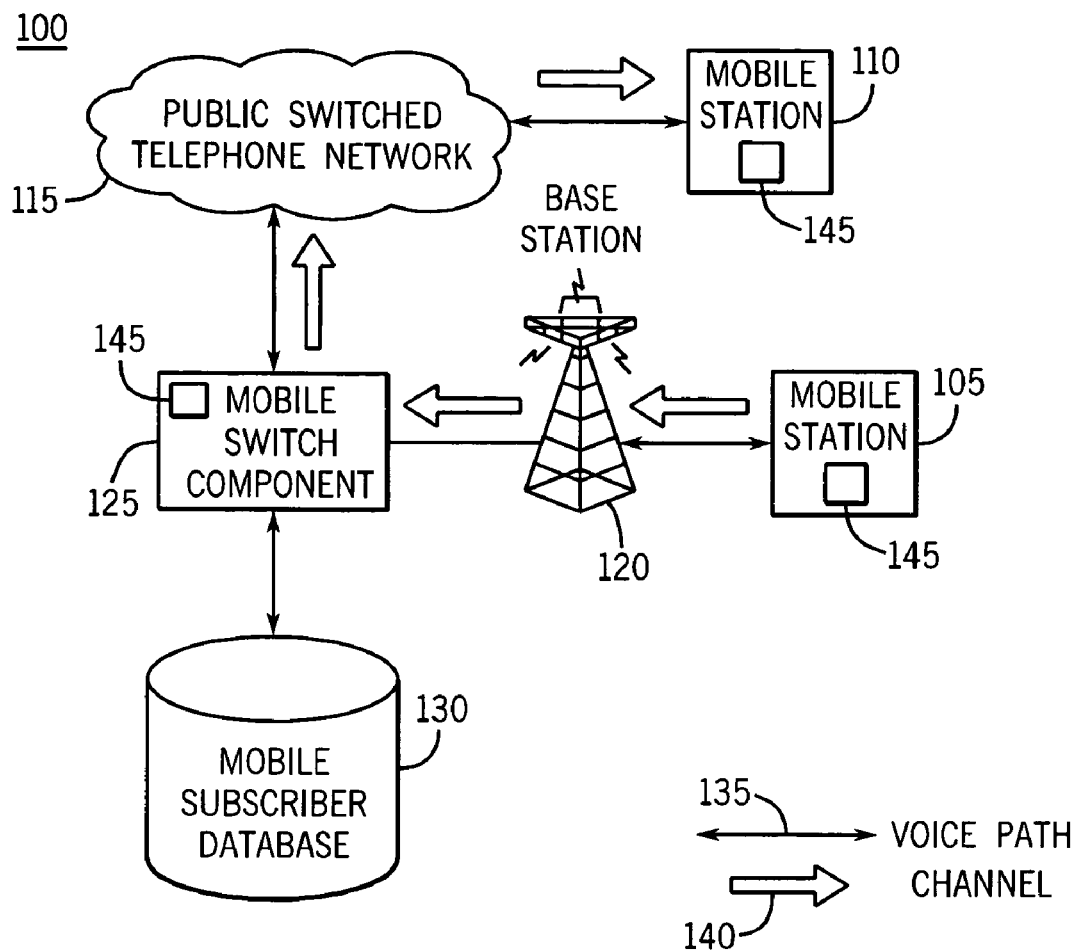
FIG. 1 is a representation of one implementation of an apparatus that comprises one or more mobile stations, one or more networks, one or more base stations, one or more mobile switch components, one or more mobile subscriber databases, one or more voice paths, and one or more channels.

Turning to FIG. 1, an apparatus 100 in one example comprises one or more mobile stations 105 and 110, one or more networks 115, one or more base stations 120, one or more mobile switch components 125, one or more mobile subscriber databases 130, one or more voice paths 135, and one or more channels 140. The mobile stations 105 and 110 comprise one or more video-enabled mobile phones. The mobile stations 105 and 110 comprise an instance of a recordable data storage medium 145. The network 115 comprises a Public Switched Telephone Network ("PSTN"). The base station 120 comprises a cellular base station. The mobile switch component 125 comprises a switch. The mobile switch component 125 comprises an instance of the recordable data storage medium 145, as described herein. The mobile subscriber database 130 comprises a database that stores subscriber records for users of the mobile stations 105 and/or 110. The voice path 135 comprises a path for transmission of voice between the mobile stations 105 and 110. The voice path 135 in one example comprises a fundamental channel. The mobile switch component 125 establishes the voice path 135 (e.g., the fundamental channel) between the mobile stations 105 and 110. The mobile switch component 125 performs a transmission of voice between the mobile station 105 and the mobile station 110 through employment of the voice path 135, as will be understood by those skilled in the art.

The channel 140 between the mobile station 105 and the mobile station 110 in one example comprises a high-bandwidth data path for a real-time transmission of a video. In one example, the channel 140 in one example comprises a transient data path. The mobile switch component 125 establishes the channel 140 between the mobile station 105 and the mobile station 110 to perform the real-time transmission of the video. Upon completion of the real-time transmission of the video, the mobile switch component 125 tears down the channel 140.

In another example, the channel 140 in one example comprises a supplemental channel, as will be appreciated by those skilled in the art. While the mobile station 105 and the mobile station 110 are engaged on a voice call, the mobile switch component 125 establishes the channel 140 (e.g., the supplemental channel) between the mobile station 105 and the mobile station 110. The mobile switch component 125 performs a real-time transmission of a video from the mobile station 105 to the mobile station 110 through employment of the channel 140. The mobile switch component 125 simultaneously performs the transmission of the voice through employment of the voice path 135 and the real-time transmission of the video through employment of the channel 140.

To establish the channel 140, the mobile switch component 125 detects an initiation of a real-time transmission of a video from the mobile station 105. For example, the mobile switch component 125 detects a soft key press from the mobile station 105. The mobile switch component 125 receives a message from the mobile station 150 over an access channel or non-voice channel. The mobile switch component 125 determines from the message that the soft key had been pressed, as will be appreciated by those skilled in the art. Upon authorizing the mobile station 105 to perform the real-time transmission of the video over the network 115, the mobile switch component 125 cooperates with the network 115 to establish the channel 140. The mobile switch component 125 cooperates with the network 115 to allocate one or more channel resources of a plurality of channel resources of the network 115.

For example, the mobile switch component 125 associates a real-time service level with a real-time transmission of a video from the mobile station 105 to the mobile station 110. The mobile switch component 125 employs the real-time service level to allocate one or more channel resources of a plurality of channel resources of the network 115. For example, the mobile switch component 125 allocates buffer space for the real-time transmission of the video based on the real-time service level. The mobile switch component 125 employs the real-time service level to transmit the video from the mobile station 105 to the mobile station 110 in real-time.

To tear down the channel 140, the mobile switch component 125 detects a completion of the real-time transmission of the video from the mobile station 105. For example, the real-time transmission of the video comprises a continuous stream of data. When the mobile station 105 ends transmission of the video, the mobile switch component 125 detects a lack of data. Upon determination of the completion of the real-time transmission of the video, the mobile switch component 125 cooperates with the network 115 to tear down the channel 140. The mobile switch component 125 and the network 115 cooperate to de-allocate one or more channel resources of the plurality of channel resources of the network 115.

The mobile switch component 125 and the mobile subscriber database 130 cooperate to determine an availability of the mobile station 105 and the mobile station 110 to perform a real-time transmission of a video. For example, the mobile switch component 125 reads a subscriber entry for the mobile station 105 from the mobile subscriber database 130. The mobile switch component 125 reads a subscriber entry for the mobile station 110 from the mobile subscriber database 130. The mobile switch component 125 evaluates the subscriber entry for the mobile station 105 to determine if the mobile station 105 is authorized to perform a real-time transmission of a video over the network 115. The mobile switch component 125 evaluates the subscriber entry for the mobile station 105 to determine if the mobile station 105 is a video capable device. The mobile switch component 125 evaluates the subscriber entry for the mobile station 110 to determine if the mobile station 110 is a video capable device. The mobile switch component 125 establishes the channel 140 between the mobile station 105 and the mobile station 110 where the mobile station 105 is authorized to perform the real-time transmission of the video and that the mobile stations 105 and 110 are video capable devices. Where the mobile switch component 125 determines that the mobile station 105 is not authorized to perform the real-time transmission of the video, or the mobile station 110 is not a video capable device, the mobile switch component 125 instructs the mobile station 105 to store the video in a storage component of the mobile station 105.

The mobile station 105 in one example stores the video in a storage component of the mobile station 105, for example, the recordable data storage medium 145. For example, the mobile switch component 125 determines that the mobile station 105 is unavailable to perform a real-time transfer of video (e.g., the mobile station 105 is not authorized or a signal strength of the mobile station 105 is below a pre-defined threshold) the mobile switch component 125 instructs the mobile station 105 to store the video in the storage component of the mobile station 105. When the mobile switch component 125 determines that the mobile station 105 is available to perform the real-time transmission of the video, the mobile switch component 125 instructs the mobile station 105 to retrieve the video from the storage component of the mobile station 105 (i.e., the recordable data storage medium 145). The mobile switch component 125 establishes the channel 140 between the mobile station 105 and the mobile station 110. The mobile station 105 sends the video to the mobile station 110 through employment of the channel 140.

An illustrative description of exemplary operation of the apparatus 100 is presented, for explanatory purposes.

Figure 2:
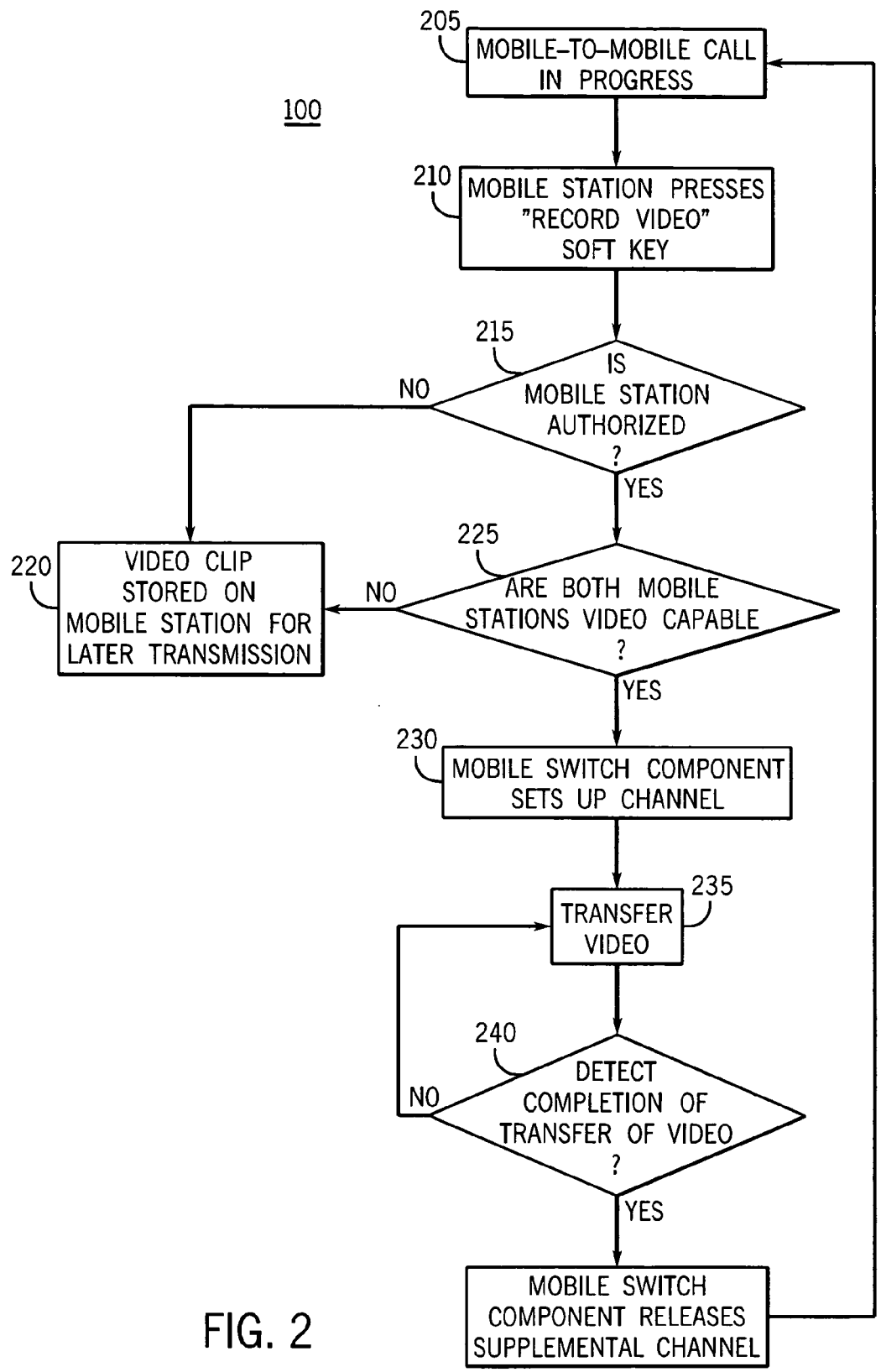
FIG. 2 is a representation of an exemplary process flow of the mobile switch component establishing and tearing down the channel of the apparatus of FIG. 1.

Turning to FIG. 2, in STEP 205, the mobile station 105 is engaged in a voice call over the voice path 135 with the mobile station 110 over the network 115. In STEP 210, the mobile switch component 125 monitors the voice path 135 and detects a "record video" button press from the mobile station 105. In STEP 215, the mobile switch component 125 cooperates with the mobile switch component 130 to authorize the mobile station 105 to perform a real-time transmission of a video over the network 115. If the mobile switch component 125 determines that the mobile station 105 is not authorized to perform the real-time transmission of the video, the mobile switch component 125 instructs the mobile station 105 to store the video, as in STEP 220. If the mobile switch component 125 determines that the mobile station 105 is authorized to perform the real-time transmission of the video, the mobile switch component 125 determines if the mobile station 105 and the mobile station 110 are both video capable, as in STEP 225. If the mobile station 110 is not video capable, the mobile switch component 125 instructs the mobile station 105 to store the video, as in STEP 220.

In STEP 230, the mobile switch component 125 cooperates with the network 115 to allocate channel resources to establish the channel 140 between the mobile station 105 and the mobile station 110. In STEP 235, the mobile station 105 sends the real-time transmission of the video to the mobile station 110 through employment of the channel 140. In STEP 240, the mobile switch component 125 detects a completion of the real-time transfer of the video. In STEP 245, the mobile switch component 125 cooperates with the network 115 to release the channel resources to tear down the channel 140. While the mobile station 105 and the mobile station 110 are engaged on the voice call over the voice path 135, the mobile switch component 125 monitors an access channel for the "record video" button press to establish another of the channel 140 for a real-time transfer of a second video from the mobile station 105 to the mobile station 110.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 145 of the mobile stations 105 and 110, and the mobile switch component 125. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the step of:
attempting to perform a real-time transmission of a video from a first mobile station to a second mobile station through employment of a data path between the first mobile station and the second mobile station;
wherein the first mobile station establishes a voice call with the second mobile station;
wherein the data path for the real-time transmission of the video is established in response to a soft-key of the first mobile station pressed during the voice call between the first mobile station and the second mobile station;
receiving a first indication at the first mobile station indicating that at least one of a) the second mobile station is not a video capable device, or b) the first mobile station is unavailable, wherein unavailable comprise at the least one of the first mobile station is not authorized to perform video transmission or the first mobile station is below a predetermined signal strength threshold;
storing the video in a storage component comprising the first mobile station based upon the first indication; and
after the first mobile station stores the video, the first mobile receives a second indication indicating that the first mobile station is available to perform real-time transmission of video, and upon receipt of the second indication the first mobile station retrieves the video from the storage component comprising the first mobile station and communications the video to the second mobile station.

2. The method of claim 1, wherein the step of attempting to perform the real-time transmission of the video from the first mobile station to the second mobile station through employment of the data path between the first mobile station and the second mobile station comprises the step of:
detecting at a mobile switch component, an initiation of the real-time transmission of the video from the first mobile station wherein the initiation of the real-time transmission of the video is performed in response to the soft-key of the first mobile station that is pressed; and
receiving, at the mobile switch component, the soft key press from the first mobile station.

3. The method of claim 1 wherein if the first indication indicates that the second mobile station is not a video capable device, the first mobile station stores the video in the storage component comprising the first mobile station.

4. The method of claim 1 wherein if the first indication indicates that the first mobile station is below a predetermined signal strength threshold, the first mobile station stores the video in the storage component comprising the first mobile station.

5. The method of claim 1 wherein if the first indication indicates that the first mobile station is not authorized to perform video transmission, the first mobile station stores the video in the storage component comprising the first mobile station.

6. The method of claim 1,
wherein a mobile switch component determines that the first mobile station is available to perform real-time transmission of video, and communicates the second indication to the first mobile station, and establishes a supplemental channel between the first and second mobile station which the first mobile station uses to communicate the video.

7. The method of claim 1, further comprising:
associating a real-time service level with the real-time transmission of the video;
allocating one or more channel resources from a plurality of channel resources based on the real-time service level:,
establishing a transient data path between the first mobile station and the second mobile station; and
tearing down the transient data path upon completion of the real-time transmission of the video.

8. The method of claim 1, wherein the step of attempting to perform the real-time transmission of the video from the first mobile station to the second mobile station through employment of the data path between the first mobile station and the second mobile station comprises the step of:
making a determination to perform the real-time transmission of the video from the first mobile station to the second mobile station through employment of the data path between the first mobile station and the second mobile station;
detecting an initiation of the real-time transmission of the video from the first mobile station; and
authorizing the first mobile station to perform the real-time transmission of the video.

9. The method of claim 8, wherein the step of making the determination to perform the real-time transmission of the video from the first mobile station to the second mobile station through employment of the data path between the first mobile station and the second mobile station comprises the steps of:
making a determination of a video capability for the first mobile station;
making a determination of a video capability for the second mobile station; and
making the determination to perform the real-time transmission of the video from the first mobile station to the second mobile station through employment of the data path between the first mobile station and the second mobile station based on the determination of the video capability for the first mobile station and the determination of the video capability for the second mobile station.

10. The method of claim 1, wherein the data path between the first mobile station and the second mobile station comprises a supplemental channel between the first mobile station and the second mobile station, the method further comprising the steps of:
establishing a fundamental channel between the first mobile station and the second mobile station;

performing a transmission of voice through employment of the fundamental channel;

establishing the supplemental channel between the first mobile station and the second mobile station; and performing the real-time transmission of the video through employment of the supplemental channel during the transmission of the voice through employment of the fundamental channel.

11. The method of claim 1:

wherein the step of performing the real-time transmission of the video from the first mobile station to the second mobile station through employment of the data path between the first mobile station and the second mobile station comprises the steps of retrieving the video from a storage component of the first mobile station; and further comprising performing simultaneously, the real-time transmission of the video from the first mobile station to the second mobile station through employment of the data path between the first mobile station and the second mobile station and a transmission of the voice call from the first mobile station to the second mobile station.

12. The method of claim 11, further comprising the steps of:

making a determination of a video capability based on a subscriber entry for the first mobile station;

making a determination of a video capability based on a subscriber entry for the second mobile station;

storing the video to the storage component of the first mobile station based on the determination of the video capability for the first mobile station and the determination of the video capability for the second mobile station; and wherein if the second mobile station is not authorized to perform video transmissions, a mobile switch component instructs the first mobile station to store the video in a storage component comprising the first mobile station.

13. The method of claim 1, further comprising the steps of:

storing the video to a storage component of the first mobile station based on a determination of unavailability of the first mobile station to perform the real-time transmission of the video;

retrieving the video from the storage component of the first mobile station based on a determination of availability of the first mobile station to perform the real-time transmission of the video;

wherein the step of performing the real-time transmission of the video from the first mobile station to the second mobile station through employment of the data path between the first mobile station and the second mobile station comprises the step of:

performing the real-time transmission of the video from the first mobile station to the second mobile station through employment of the data path between the first mobile station and the second mobile station upon the determination of availability of the first mobile station to perform the real-time transmission of the video.

14. An apparatus, comprising:

a mobile switch component that establishes a voice call between a first mobile station and a second mobile station, and a data path between the first mobile station on a cellular network and the second mobile station on the cellular network for a transmission of a video in real-time from the first mobile station to the second mobile station;

wherein the mobile switch component establishes the data path for the real-time transmission of the video in response to detecting a soft key press received from the first mobile station during the voice call between the first mobile station and the second mobile station;

wherein the real-time transmission of the video occurs simultaneous with the voice call and the video is transmitted from the first mobile station to the second mobile station;

wherein if at least one of a) the second mobile station is not a video capable device or b) the first mobile station is unavailable, the mobile switch component instructs the first mobile station to store the video on a component comprising the first mobile station, wherein unavailable comprises at least one of the mobile station is not authorized to perform video transmission or the first mobile station is below a predetermined signal strength threshold; and wherein after the mobile switch component has determined that the first mobile station is unavailable, if the mobile switching component then determines that the first mobile station is available, the mobile switching component instructs the first mobile station to send the video to the second mobile station where available comprises at least one of the mobile switch component determines that the first mobile station is authorized to perform video transmission or the mobile switch component determines that the first mobile station is not below a predetermined signal strength threshold.

15. The apparatus of claim 14, wherein the mobile switch component determines that the second mobile station is not a video capable device, and the mobile switch component instructs the first mobile station to store the video on a component comprising the first mobile station.

16. The apparatus of claim 14, wherein if the mobile switch component determines that the first mobile station is not authorized to perform video transmissions, the mobile switch component instructs the first mobile station to store the video in a storage component comprising the first mobile station.

17. The apparatus of claim 14, wherein if the mobile switch component determines that the first mobile station is below a predetermined signal strength threshold, the mobile switch component instructs the first mobile station to store the video in a storage component comprising the first mobile station.

18. An apparatus, comprising:

a mobile switch component that establishes a data path between a first mobile station on a cellular network and a second mobile station on the cellular network for a transmission of a video in real-time;

wherein the mobile switch component establishes the data path for the real-time transmission of the video during a voice call between the first mobile station and the second mobile station; and if the first mobile station is unavailable to transmit video, the mobile switching component instructs the first mobile station to store the video on a component comprising the first mobile station; and when the mobile switching component determines that the first mobile station is available to transmit video, the mobile switch component instructs the first mobile station to retrieve the stored video and transmit the video to the second mobile station wherein unavailable comprises at least one of the first mobile station is not authorized to perform video transmission or the first mobile station is below a predetermined signal strength threshold.

19. The method of claim 3, further comprising, after it is determined that the first mobile station is unavailable and the first mobile station has stored the video, if a mobile switching component determines that the first mobile station is available, the mobile switching component instructs the first mobile station to send the video to the second mobile station where available comprises at least one of the first mobile station is authorized to perform video transmission or the first mobile station is not below a predetermined signal strength threshold.

* * * * *